United States Patent
Alemrajabi et al.

(10) Patent No.: US 11,509,000 B2
(45) Date of Patent: Nov. 22, 2022

(54) PROCESS FOR THE RECOVERY OF CATHODE MATERIALS IN THE RECYCLING OF BATTERIES BY REMOVING ALUMINUM AND IRON

(71) Applicant: Northvolt AB, Stockholm (SE)

(72) Inventors: Mahmood Alemrajabi, Stockholm (SE); Ingrid Karlsson, Stockholm (SE); Ragnar Sjödahl, Stockholm (SE); Emma Nehrenheim, Stockholm (SE); Martina Petranikova, Gothenburg (SE); Cristian Tunsu, Gothenburg (SE)

(73) Assignee: NORTHVOLT AB, Stockholm (SE)

( * ) Notice: Subject to any disclaimer, the term of this patent is extended or adjusted under 35 U.S.C. 154(b) by 0 days.

(21) Appl. No.: 17/601,865

(22) PCT Filed: Apr. 14, 2020

(86) PCT No.: PCT/EP2020/060487
§ 371 (c)(1),
(2) Date: Oct. 6, 2021

(87) PCT Pub. No.: WO2020/212363
PCT Pub. Date: Oct. 20, 2020

(65) Prior Publication Data
US 2022/0149452 A1 May 12, 2022

(30) Foreign Application Priority Data

Apr. 15, 2019 (SE) .................................. 1950468-7

(51) Int. Cl.
| | |
|---|---|
| H01M 10/00 | (2006.01) |
| H01M 10/54 | (2006.01) |
| C22B 3/06 | (2006.01) |
| C22B 3/44 | (2006.01) |
| C22B 7/00 | (2006.01) |
| C22B 15/00 | (2006.01) |
| C22B 3/00 | (2006.01) |
| C22B 26/12 | (2006.01) |
| C22B 47/00 | (2006.01) |

(52) U.S. Cl.
CPC ............... *H01M 10/54* (2013.01); *C22B 3/06* (2013.01); *C22B 3/44* (2013.01); *C22B 7/007* (2013.01); *C22B 15/0067* (2013.01); *C22B 23/0415* (2013.01); *C22B 23/0461* (2013.01); *C22B 26/12* (2013.01); *C22B 47/00* (2013.01)

(58) Field of Classification Search
CPC . H01M 10/54; C22B 3/06; C22B 3/44; C22B 7/007; C22B 15/0067; C22B 23/0415; C22B 23/0461; C22B 26/12; C22B 47/00
See application file for complete search history.

(56) References Cited

U.S. PATENT DOCUMENTS

2011/0059339 A1    3/2011   Yamasaki et al.

FOREIGN PATENT DOCUMENTS

| CN | 109280771 A | | 1/2019 |
|---|---|---|---|
| CN | 110482511 A | * | 11/2019 |
| DE | 10-2014-014894 A1 | | 4/2016 |
| EP | 2450991 A1 | | 5/2012 |
| EP | 2532759 A1 | | 12/2012 |
| EP | 3431619 A1 | | 1/2019 |
| WO | WO-2018/209164 A1 | | 11/2018 |

OTHER PUBLICATIONS

International Searching Authority, International Search Report and Written Opinion for International Application No. PCT/EP2020/060487, dated Jul. 20, 2020, (10 pages), European Patent Office, Rijswijk, Netherlands.
Wu, Zhao-Jin et al. *A Novel Conversion Of Converter Sludge Into Amorphous Multi-Duped FePO₄ Cathod Material For Lithium Ion Batteries*, Script Materialia, vol. 67, No. 2, pp. 221-224, Apr. 23, 2012, ISSN: 1359-6462, DOI: 10.1016/JSCRIPTAMAT.2012.04.027.
Ekberg, Christian et al. *Lithium Batteries Recycling*, Lithium Process Chemistry, Jan. 1, 2015, pp. 233-267, ISBN: 978-0-12-801417-2, DOI: 10.1016/B978-0-12-801417-2.00007-4.

\* cited by examiner

*Primary Examiner* — Steven J Bos
(74) *Attorney, Agent, or Firm* — Alston & Bird LLP

(57) ABSTRACT

A process for removal of aluminium and iron in the recycling of rechargeable batteries comprising providing a leachate from black mass, adding phosphoric acid ($H_3PO_4$) to said leachate and adjusting the pH to form iron phosphate ($FePO_4$) and aluminium phosphate ($AlPO_4$), precipitating and removing the formed $FePO_4$ and $AlPO_4$, and forming a filtrate for further recovery of cathode metals, mainly NMC-metals and lithium.

20 Claims, 4 Drawing Sheets

PROCESS FOR THE RECOVERY OF CATHODE MATERIALS IN THE RECYCLING OF BATTERIES BY REMOVING ALUMINUM AND IRON

CROSS REFERENCE TO RELATED APPLICATIONS

This application is a National Stage Application, filed under 35 U.S.C. § 371, of International Application No. PCT/EP2020/060487, filed Apr. 14, 2020, which international application claims priority to Swedish Application No. 1950468-7, filed Apr. 15, 2019; the contents of both of which as are hereby incorporated by reference in their entireties.

BACKGROUND

Related Field

The present disclosure relates to the recycling of batteries, and in particular process steps in the recovery of cathode materials such as lithium (Li), nickel (Ni), manganese (Mn), and cobalt (Co), the latter three frequently referred to as NMC metals.

Description of Related Art

The transition from fossil fuels towards renewable energy has gained considerable momentum. One of the most important contributing factors is the development of better and cheaper rechargeable batteries. Currently, lithium-ion batteries are becoming increasingly popular. They represent a type of rechargeable battery in which lithium ions move from the negative electrode to the positive electrode during discharge and back when charging. As a consequence of this popularity, the demand for elements necessary in lithium ion batteries is increasing exponentially. Such elements include, apart from lithium, also NMC metals, and in particular cobalt. The global sources of cobalt appear to be depleting, which in turn shifts the focus from extraction to recovery of cobalt. In addition, cobalt mining is in some countries associated with serious negative environmental and social impact such as pollution, child labor etc.

Economical and environmentally friendly recycling of lithium batteries is necessary to conserve natural resources and minimize pollution. Additionally, recycling will also provide a sustainable source for the production of new batteries. Currently, lithium-ion battery recycling is still in its early stages of development. At this stage, one of the major obstacles is the lack of a steady supply. Once the amount of expired batteries has increased, it will be easier to develop a cost-effective technology and a global standardized process. Also, the high cost of recycling creates a profitability barrier that inhibits the development of a large-scale market. Another problem to consider is that lithium-ion batteries from different manufacturers use different chemical processes to store and release energy, which makes it difficult to create a standardized recycling procedure.

To conclude, the forecasted increase in demand for raw materials for lithium ion batteries, the critical reserves of cobalt and the instability in supply and price of lithium, make it highly desirable to develop efficient and cost-effective recycling processes.

US2011059339 (H. Yamasaki et al.) discloses a method for treating lithium batteries. The method includes an acid solution treatment process wherein an acid solution, namely aqueous phosphoric acid solution, aqueous carbonic acid water or aqueous hydrogen sulfide, is brought into contact with the surface of the positive active material layer and the positive current collector which constitute the positive electrode member. Then the positive active material layer is separated from the positive current collector and subjected to an oxalic acid treatment process wherein the material for treatment containing metal components originating from the positive active material layer is reacted with aqueous oxalic acid solution.

DE102014014894 (Adensis GmbH) discloses a method for the recovery of material from the cathode of lithium ion batteries. The method comprises acidic detachment of the cathode material from the substrate material through the use of oxidizing or non-oxidizing acids. As oxidizing acids, preferably nitric acid and/or phosphoric acid and/or sulfuric acid can be used.

EP2532759 (SARP Industries) discloses a method for separating materials from lithium batteries, wherein the process comprises leaching a ground material in an acid medium so as to dissolve a part of the ground material to obtain a solution containing metal ions and a portion of insoluble ground material and separating the metal ions present in the solution. The acid used in the leaching step is selected from mineral acids, such as sulfuric acid, hydrochloric acid, phosphoric acid, nitric acid and mixtures of a or more thereof. The preferred acid is sulfuric acid.

EP2450991 (Eco Recycling S.R.L.) discloses a process for treating all the end-of-life accumulator and battery types except the alkaline, zinc-carbon ones and lead accumulators. The process comprises a first phase of physical operations and a second phase of chemical operations which all together allow the recovery of copper and plastic materials typically contained in nickel-metal hydride accumulators, lithium ion batteries and accumulators, primary lithium batteries. The process is characterized by the use of a purification operation by means of a solvent which allows obtaining lithium products ($Li_2CO_3$), cobalt ($Co/CoSO_4/CoCO_3$) and nickel ($Ni/NiCO_3$) of high purity.

WO 2018/209164 (Worcester Polytechnic Institute) concerns the extraction of Co (cobalt), Ni (nickel), Al (aluminium) and Mn (manganese) for the production of active cathode materials for new batteries. $LiFePO_4$ forms as a waste stream and is often discarded due to infeasibility of recycling. WO 2018/209164 teaches the precipitation of $LiFePO_4$ as $FePO_4$ forming a by-product, along with graphite and carbon, which are not dissolved into the solution. $FePO_4$ can then be separated from graphite and carbon and used to synthesize $LiFePO_4$ as cathode material whereas graphite can be regenerated as anode material.

BRIEF SUMMARY

In view of an increasing demand for metals used in rechargeable lithium ion batteries, and a growing concern for the environment, it remains to develop improved processes for the recovery of cathode metals.

A first aspect of the present disclosure is a process for removal of aluminium and iron in the recycling of rechargeable batteries, preferably rechargeable lithium ion batteries, said process comprising the following steps:

a) providing a leachate from black mass, b) adding phosphoric acid ($H_3PO_4$) to the leachate from step a), c) adjusting the pH to form iron phosphate ($FePO_4$) and aluminium phosphate ($AlPO_4$), d) precipitating and removing the formed $FePO_4$ and $AlPO_4$, and e) forming a filtrate for recovery of cathode metals.

According to an embodiment of said aspect, the precipitation is performed in two separate steps at different pH.

In the first precipitation step the pH is adjusted, optionally with alkali, to an interval of pH 1.5 to 4, such as pH 1.5 to 3.5, preferably pH 1.5 to 3.

In a second step the pH is adjusted to an interval of pH 2.5 to 6.5, such as pH 2.5 to 6, preferably pH 2.5 to 4.

According to an embodiment, freely combinable with the above, crystallization seeds are added to precipitate $FePO_4$ and $AlPO_4$ in the first precipitation step.

Preferably, the crystallization seeds comprise aluminium and iron phosphate crystals, said seeds are added in an amount of 0.05-0.3 g/L, such as 0.05-0.2 g/L, and preferably 0.05-0.15 g/L.

The first and second precipitation steps are preferably conducted at a temperature in an interval of 20-95° C., such as 55-95° C., such as 55-85° C., and preferably 65-75° C.

Preferably, the precipitation steps each have a residence time in an interval of 2-24 h, such as 12-18 h, such as 2-12 h, preferably 2-6 h.

According to an embodiment, freely combinable with the above aspect and embodiments, a higher amount of $FePO_4$ and $AlPO_4$ is precipitated in the first precipitation step than in the second precipitation step. The first precipitate is removed by filtration, and the leachate comprising traces of aluminium and iron is led to a second precipitation step where the pH is adjusted to an interval of pH 2.5 to 6.5, such as pH 2.5 to 6, preferably pH 2.5 to 4. A second precipitate is formed and removed by filtration. The resulting leachate is substantially free from aluminium and iron and rich in NMC-metals and lithium. In the case that the leachate from black mass was substantially free from copper, the resulting leachate is also copper free. In case the leachate from black mass comprised copper, this can be removed after the removal of aluminium and iron, for example by precipitation or by solvent extraction.

Optionally, this leachate is subjected to further treatment to separate lithium and precipitate NMC metals in the form of hydroxides.

According to an embodiment, freely combinable with the above aspect and embodiments, the precipitates comprising $FePO_4$ and $AlPO_4$ are washed with an acid aqueous solution, preferably an aqueous solution having a pH in the interval of pH 1.5-5.5, preferably pH 1.5-2.5. The precipitate formed in the first precipitation step, as well as in the second precipitation step, is washed with said acid aqueous solution, and the acid filtrate is recirculated to a black mass leaching unit.

The leachate from black mass is preferably substantially copper free or contains only small amounts of copper, preferably less than 10 ppm, preferably less than 5 ppm of copper. In the alternative, said leachate may contain copper, and in that case the copper is removed subsequently to the removal of aluminium and iron.

BRIEF DESCRIPTION OF THE FIGURES

Different aspects are now described, by way of example, with reference to the accompanying drawings, in which:

FIG. 1 is a schematic flow chart illustrating a process for recovery of cathode metals in the recycling of batteries. In the flow chart, a leaching step (A) is followed by a filtration step (B) from which the leach residue is led to a washing step (W). The filtrate from B is led to a copper extraction step (C) with an associated copper recovery step (D), e.g. solvent extraction of copper with one or more (mixtures of) copper-specific extracting compound (s), followed by copper electroextraction or electrowinning, producing copper metal. A substantially copper free leachate is then led to an aluminium and iron precipitation unit (E). After removal of copper, aluminium and iron, the NMC metals are recovered in step (F) together with minimal amounts of lithium. In step (G) this minimal amount of lithium is selectively dissolved, producing an NMC hydroxide cake. The lithium rich solution from step F is led to a lithium recovery unit (H). Wash solutions from steps W and G can be recirculated back to the initial leaching step A.

FIG. 2 is a schematic flow chart illustrating an embodiment where the Al and Fe phosphate precipitation operation is performed in one step. A leachate (X) containing substantially no copper or only small amounts of copper enters a first precipitation tank 200 via a pH adjustment unit 100. After a predefined residence time, the content of the tank 200 is filtered in a filter 300, producing a precipitate and a leachate (Y), wherein the leachate is substantially free from copper, aluminium and iron, and rich in NMC-metals and lithium. The precipitate is led to a washing unit 310 to be subjected to an acid washing solution, producing a washed precipitate (Z) of $FePO_4$ and $AlPO_4$ with trace amounts of co-precipitated Li.

FIG. 3 is a schematic flow chart illustrating an embodiment of the Al and Fe phosphate precipitation operation in two steps. A leachate (I) containing substantially no copper or only small amounts of copper enters a first precipitation tank 200 via a pH adjustment unit 100. After a predefined residence time, the content of the tank 200 is filtered in a filter 300, producing a precipitate and a leachate. The precipitate is led to a washing unit 310 to be subjected to an acid washing solution, while the leachate is led to a second precipitation tank 500 via a pH adjustment unit 400. After another residence time, which can be the same or different as in the previous step, the content of the tank 500 is filtered in the filter 600, producing a leachate IV which is substantially free from copper, aluminium and iron, and rich in NMC-metals and lithium, and a precipitate, that is washed in unit 610, comprising residual aluminium and iron in the form of phosphates.

DETAILED DESCRIPTION OF VARIOUS EMBODIMENTS

Before the present invention is described, it is to be understood that the terminology employed herein is used for the purpose of describing particular embodiments only and is not intended to be limiting, since the scope of the present invention will be limited only by the appended claims and equivalents thereof.

Batteries can coarsely be divided into disposable and rechargeable batteries. Disposable batteries are mainly alkaline, meaning that the cathode is made of manganese oxide, the anode is a zinc powder, and the electrolyte is potassium hydroxide. Currently a very large proportion of all disposable batteries end up as landfill. Rechargeable batteries can be based on different chemistry, illustrated by the increasingly popular lithium ion battery, where lithium cobalt oxide is used as the cathode and carbon as the anode. Another example is the nickel-cadmium battery, nickel-zinc, and the nickel-metal hydride batteries. While rechargeable batteries can be recharged hundreds or even thousands of times, and used for a long time, they will eventually need to be discarded. In order to minimize waste and to conserve the earth's resources, it is necessary to recycle both disposable and rechargeable batteries and to recover their components. In the present disclosure, the term "battery" is intended to comprise both disposable and rechargeable batteries. A battery comprises many different materials, such as plastic and metal that makes up its housing, the cathode and anode materials, and an electrolyte. The recycling of batteries starts by sorting waste batteries according to their chemical composition, and then crushing or shredding them. The shredded batteries are then moved along a conveyer belt to a shaker, where they pass through a series of filters. Plastic and metal shreds are separated, washed and collected for recycling.

This shredding and refining process results in a product called 'black mass', which contains electrolyte, cathode and anode materials, and other components. As the sorting of batteries is difficult, and sometimes neglected, the composition of the black mass will vary. Examples of different compositions of black mass (BM) rich in either nickel, NMC or cobalt is given in Table 1 below.

TABLE 1

Compositions of black mass (BM)

| | Al | Co | Ni | Mn | Li | Fe | Cu | Graphite |
|---|---|---|---|---|---|---|---|---|
| Nickel rich BM (wt %) | 3 | 2.67 | 21.13 | 2.47 | 3.71 | 0.90 | 3.89 | 26.69 |
| NMC rich BM (wt %) | 3 | 9.4 | 9.61 | 9.12 | 3.95 | 0.12 | 4.25 | 29.13 |
| Cobalt rich BM (wt %) | 3 | 26.41 | 0.10 | 0.10 | 3.70 | 0.90 | 3.89 | 26.71 |

In the present description and claims, the term "black mass" is thus used to describe the crushed or shredded inner contents of batteries, fed to a recycling process, after the removal of plastic, solid metal parts etc.

The term "cathode materials" and "cathode metals" are used interchangeably to describe the materials or metals constituting the cathode in a battery. Common cathode materials are lithium cobalt oxide (also referred to as lithium cobaltate), lithium manganese oxide (also known as spinel or lithium manganate), lithium iron phosphate, as well as lithium nickel manganese cobalt (frequently abbreviated NMC) and lithium nickel cobalt aluminium oxide (NCA).

The vast majority of lithium-ion batteries use graphite powder as an anode material. The term "anode material" however comprises natural and artificial graphite, activated carbon, carbon black, conductive additives, LTO (lithium titanate), surface-functionalized silicon, and high-performance powdered graphene.

Finally, it must be noted that, as used in this specification and the appended claims, the singular forms "a," "an," and "the" include plural referents unless the context clearly dictates otherwise.

A first aspect of the present disclosure relates to a process for the recovery of aluminium and iron in the recycling of rechargeable batteries, wherein said process comprises the following steps:

a) providing a leachate from black mass,
b) adding phosphoric acid ($H_3PO_4$) to the leachate from step a),
c) adjusting the pH to form iron phosphate ($FePO_4$) and aluminium phosphate ($AlPO_4$),
d) precipitating and removing the formed $FePO_4$ and $AlPO_4$, and
e) forming a filtrate for recovery of cathode metals.

The leachate in step a) is preferably substantially copper free meaning that it contains substantially no copper or only small amounts of copper, preferably containing less than 10 ppm, preferably less than 5 ppm copper. In the alternative, the leachate may contain copper, and the copper can be removed subsequently to the removal of aluminium and iron, for example by precipitation or by solvent extraction.

The leachate typically has a pH below 1.5, such as below 1, and preferably below 0.7, such as about pH 0.5.

Iron and aluminium have low solubility as phosphates in their trivalent state and the addition of $H_3PO_4$ to the first leachate, thus, efficiently precipitates iron and aluminium for further recovery. The precipitation of Fe and Al in the form of phosphates is advantageous compared to the precipitation in the form of hydroxides, as Al and Fe hydroxides tend to absorb NMC metals and lithium. Further, Al and Fe phosphates are easier to separate by filtration and also easier to wash than the corresponding hydroxides.

According to an embodiment of said aspect, the precipitation is performed as two separate steps at different pH, which is advantageous because a higher efficiency in the removal of aluminium and iron is achieved. In such a case, the first step may be performed using the same conditions as in a single step precipitation.

In the first precipitation step the pH is adjusted, optionally with alkali, to an interval of pH 1.5 to 4, such as pH 1.5 to 3.5, preferably pH 1.5 to 3. In a second step the pH is adjusted, optionally with alkali, to an interval of pH 3 to 6.5, such as pH 3 to 6, preferably pH 3 to 5.5.

Preferably, crystallization seeds are added to precipitate $FePO_4$ and $AlPO_4$ in the first precipitation step. Adding crystallization seeds promotes crystallization and facilitates agglomeration of $FePO_4$ and $AlPO_4$ and, thus, allows efficient separation by filtration.

Preferably, the crystallization seeds comprise aluminium and iron phosphate crystals, and said seeds are added in an amount of 0.05-0.3 g/L, such as 0.05-0.2 g/L, and preferably 0.05-0.15 g/L.

Performing the first precipitation at a low pH has the advantage of minimizing the co-precipitation of lithium and NMC metals. When the second precipitation step is performed, less solids are present. This is advantageous, as this counteracts the tendency of co-precipitation at higher pH.

The first and second precipitation steps are typically conducted at a temperature in an interval of 20-95° C., such as 55-95° C., such as 55-85° C., and preferably 65-75° C. An advantage is that the efficiency of the precipitation is higher at an increased temperature.

The precipitation steps typically have a residence time in the interval of 2-24 h, such as 12-18 h, such as 2-12 h, preferably 2-6 h, and advantageously, this allows a high amount of $FePO_4$ and $AlPO_4$ to form and agglomerate. The temperature and time correlate; if the temperature is higher, the time will be shorter and vice versa.

Preferably, a higher amount of $FePO_4$ and $AlPO_4$ are precipitated in the first precipitation step than in the second precipitation step since more $FePO_4$ and $AlPO_4$ are present in the first leachate that can be precipitated.

Preferably, the precipitate comprising $FePO_4$ and $AlPO_4$ is washed with an aqueous solution having a pH in the interval of pH 1.5-5.5, preferably pH 1.5-2.5, for efficient washing.

In a preferred embodiment, the filtrate contains lithium, nickel, manganese and cobalt in amounts suitable for recovery, and is substantially free of aluminium, copper, and iron, such as containing less than 10 ppm, preferably less than 5 ppm of aluminium and/or iron and/or copper. A suitable technique for determining such amounts is inductively coupled plasma optical emission spectrometry (ICP-OES).

The process disclosed herein results in a more effective removal of iron and aluminium, while minimizing co-precipitation of the valuable NMC metals, nickel, manganese and cobalt. Simultaneously, the process results in the production of a lithium rich filtrate which is substantially free from copper, iron and aluminium, and which therefore is well suited both for the precipitation of NMC metals and for the recovery of lithium.

EXAMPLES

Example 1: Al and Fe Phosphate Precipitation Performed in One Step

Figure 1:
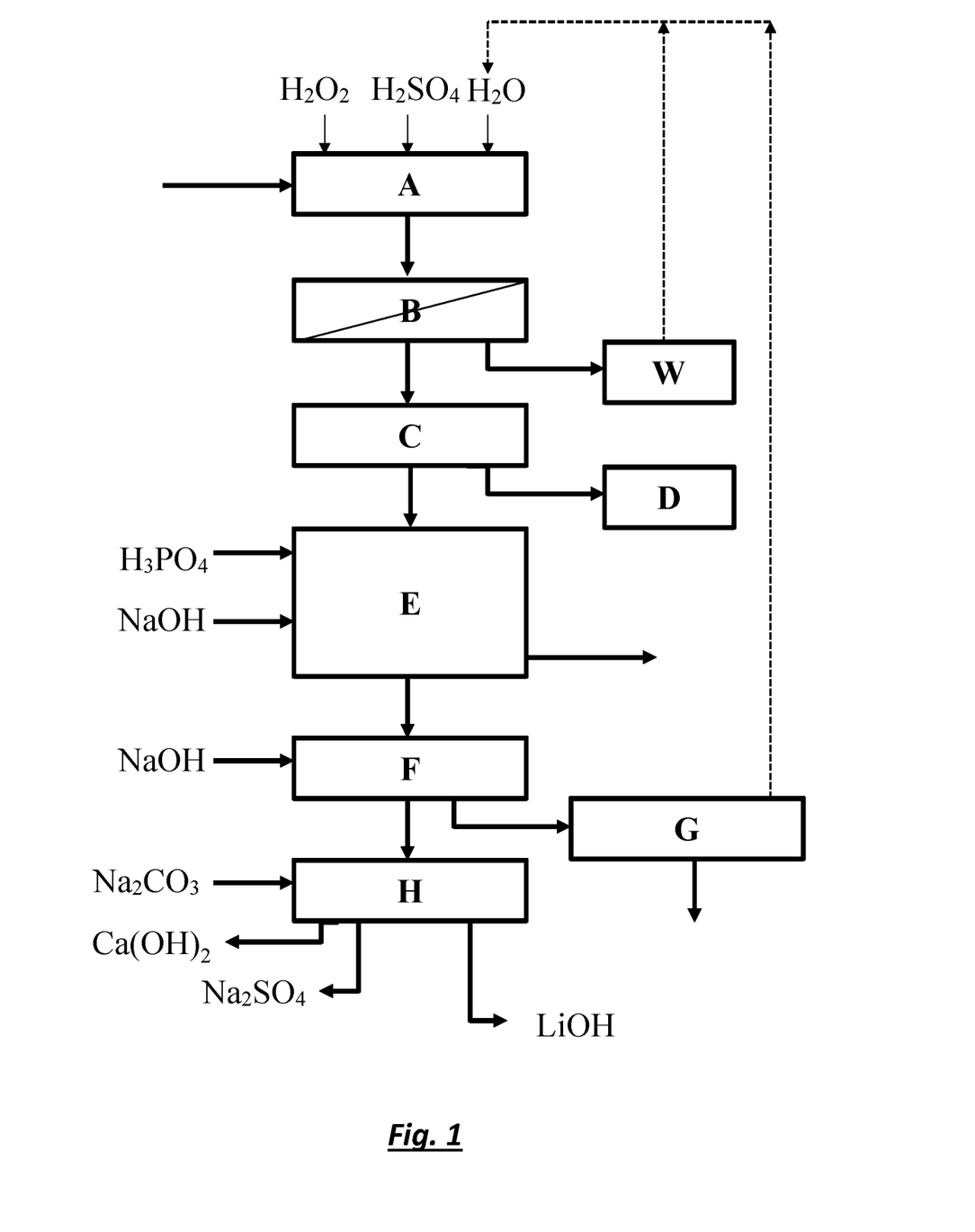
Figure 2:
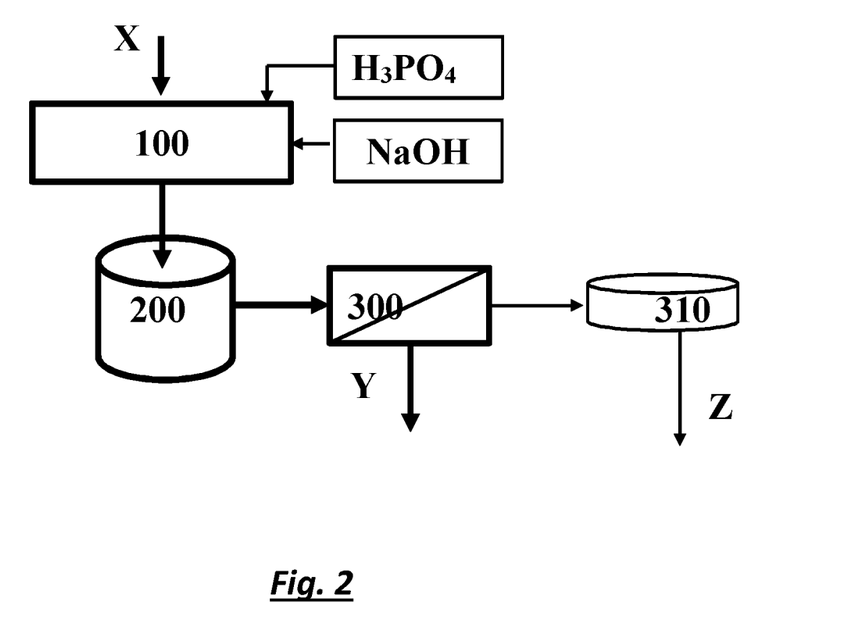

A leachate (X) from which substantially all copper has been removed, is led into a precipitation unit 100 as schematically shown in FIG. 2. In this example, the flow of leachate is about 60 l/h and the pH of this initial leachate is about 0.5. In a first step, the pH is adjusted to about 2.5 by the addition of 85% phosphoric acid ($H_3PO_4$) and sodium hydroxide (NaOH, solid). The leachate is collected in a precipitation tank 200, to which crystallization seeds (Al and Fe phosphate crystals) are added, to a concentration of about 0.1 g/l in said tank. The residence time in the first precipitation tank is preferably about 24 h at a temperature of at least 70° C., following which the contents are led to a separation unit 300, for example a filter, and separated into a precipitate and a filtrate (Y). The precipitate is led to a washing unit 310, producing a washed precipitate (Z) of FePO4 and AlPO4 with trace amounts of co-precipitated Li and NMC.

Example 2: Al and Fe Phosphate Precipitation Performed in Two Steps

Figure 3:
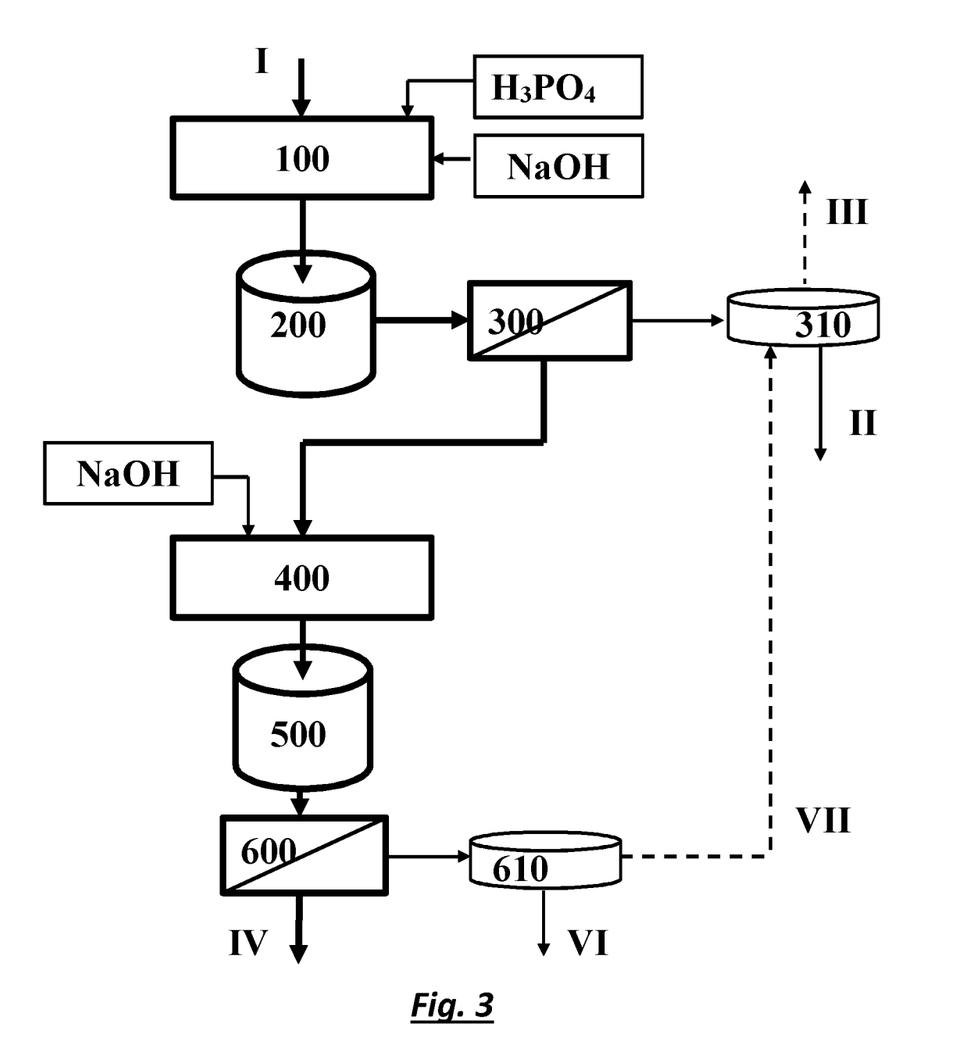

A leachate (I) from which substantially all copper has been removed, is led into a precipitation unit 100 as schematically shown in FIG. 3. In this example, the flow of leachate is about 60 L/h and the pH of this initial leachate is about 0.5. In a first step, the pH is adjusted to about 2.5 by the addition of 85% phosphoric acid ($H_3PO_4$) and sodium hydroxide (NaOH, solid). The leachate is collected in a first precipitation tank 200, to which crystallization seeds (Al and Fe phosphate crystals) are added, to a concentration of about 0.1 g/l in said tank. The residence time in the first precipitation tank is preferably about 24 h at a temperature of at least 70° C., following which the contents are led to a separation unit 300, for example a filter, and separated into a precipitate and a filtrate.

The precipitate is led to a washing unit 310, producing a washed precipitate (II) of $FePO_4$ and $AlPO_4$ with trace amounts of co-precipitated Li and NMC and a filtrate (III). This filtrate (III) is preferably recycled, for example by leading it to a leaching unit up-stream in the recycling process (not shown).

The pH of the filtrate from the precipitation tank 200 and the separation unit 300 is adjusted to about pH 5, in unit 400, for example by the addition of NaOH and led to a second precipitation tank 500. The residence time in the second precipitation tank is preferably about 24 h at a temperature of at least 70° C. Optionally, crystallization seeds (Al and Fe phosphate crystals) are added, to a concentration of about 0.1 g/l in said tank. The contents of the second precipitation tank are then led to a separation unit 600, for example a filter, producing a lithium rich filtrate (IV) free of Cu, Al and Fe, and a solid precipitate. This precipitate is preferably washed, in unit 610, producing a washed solid precipitate (VI) containing residual Al and Fe, and co-precipitated Ni, Mn and Co, and a filtrate (VII) which is recirculated to wash the Al and Fe phosphate precipitate in unit 310.

The Al-Fe-precipitation works without any organic solvents, using only bulk chemicals such as NaOH and $H_3PO_4$, and produces an aqueous NMC-rich stream which is substantially free from Cu, Al and Fe. The two precipitate streams are formed, a main precipitate consisting substantially of $FePO_4$ and $AlPO_4$ with minute amounts of co-precipitated Ni, Mn and Co, and a second precipitate, comprising residual $FePO_4$ and $AlPO_4$ and co-precipitated Ni, Mn and Co. With an incoming flow of 60 l/h of a leachate having a composition typical for battery recycling processes, and an estimated 60 l/h of lithium-rich leachate/filtrate is produced. The main precipitate stream will be about 1.5 kg/h and the secondary precipitate stream 0.3 kg/h indicating that the main precipitate is indeed the Al and few phosphates.

An acid aqueous solution is preferably added in washing unit 610, and the filtrate led to washing unit 310. The consumption of water is minimized, as the filtrate from unit 310 is recycled to unit operations up-stream in the recycling/recovery process. Estimated process flows are shown in Table 3:

TABLE 3

Estimated process flows in an Al—Fe-phosphate precipitation unit

| | In | Out |
|---|---|---|
| Cu-free leachate | 60 L/h | |
| Phosphoric acid (85%) | 1.5 kg/h | |
| Sodium hydroxide | 0.75 kg/h + 1.2 kg/h | |
| Water | 3.6 L/h | |
| $FePO_4$ and $AlPO_4$ with trace amounts of Li and NMC metals | | 1.5 kg/h |
| NMC-rich filtrate without Cu, Al, Fe | | 60 L/h |
| Residual Al and Fe phosphate, co-precipitated NMC metals | | 0.3 kg/h |
| Filtrate | | 3.6 L/h |

In an industrial scale process, the first, copper free leachate is typically added in an amount of 40 000-80 000 L/h, such as 50 000-70 000 L/h, or preferably 55 000-65 000 L/h. Phosphoric acid, $H_3PO_4$ at a concentration of 85% is typically added to the first leachate in an amount of 500-2500 kg/h, such as 1000-2000 kg/h, preferably 1250-1750 kg/h to a pH of about 2.5 in the first precipitation step.

In a second precipitation step, NaOH (s) is typically added to the first leachate in an amount of 250-1500 kg/h, such as 500-1000 kg/h, preferably 700-800 kg/h in order to adjust the pH to about pH 5 for the second precipitation.

In an alternative, where the first leachate from the black mass contains copper, this can be removed after the removal of aluminium and iron, for example by precipitation or solvent extraction.

The process disclosed herein has several advantages. The precipitation of Al and Fe in the form of phosphates minimizes the co-precipitation of lithium and NMC metals. Further, Al and Fe phosphates are easier to filter and the precipitate formed is easier to wash than for example a precipitate of the corresponding hydroxides.

Additionally, the process is very flexible and can handle incoming black mass leachates with varying amounts of aluminium and iron, as these are efficiently removed at an early stage. This is particularly advantageous as large-scale recovery of rechargeable lithium ion batteries will involve the handling of black mass of varying composition. The process disclosed herein will guarantee an efficient recovery of the NMC metals and lithium also when initial leachate composition varies.

Example 3: Assessment of Precipitation Yield of Major Elements at Different pH Values as Phosphates An amount equivalent to a 10% excess to the stoichiometric $H_3PO_4$ (pure) needed ideally to precipitate iron and aluminum was added to a specific volume of leachate and mixed for 30 min. (In this case, around 60 ml of stock solution was prepared. This means that 4.52 mL of $H_3PO_4$ 85% were added to 55 mL of leachate, what would be equivalent to 82 mL of acid per 1 L of leachate).

Afterwards, this solution was poured in small glass vials so in each vial there was a volume of 5 mL of the solution. Then, NaOH 700 g/L was added slowly in order to increase the pH of the solution, making it ideal to precipitate iron and aluminum with the phosphates present in the solution.

Experiments were performed at room temperature of 22° C. in 20 ml glass vials. In order to assure a complete mixing and reaction of the compounds of study, the solutions were stirred for 2 h after the addition of NaOH.

Figure 4:
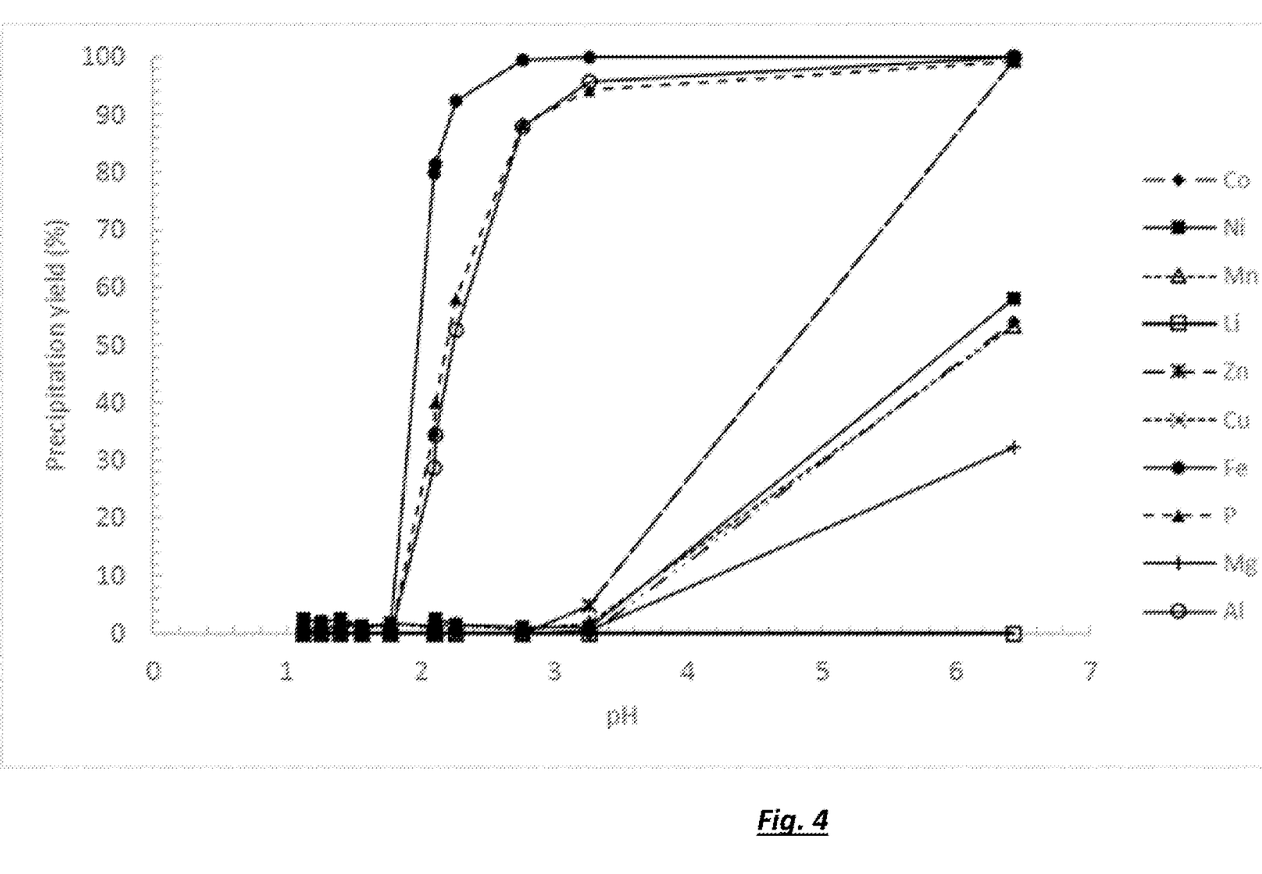
FIG. 4 is a chart based on Example 2 illustrating the dependence of precipitation yield of certain elements as phosphates at different pH values. Upon an increase in pH starting from approximately pH 1 different elements precipitate at different pH levels. The precipitation of Fe and Al starts at pH 2 and at a pH of 3.2 more than 99 and 95% has precipitated, respectively. P follows a similar trend as Al. For Cu and Zn, the precipitation starts at a pH above 3 and close to 100% precipitation yield is reached at approximately pH 6.4. Regarding Co, Ni, Mn and Mg the precipitation yield does not reach above 60% even at an increase to approximately pH 6.4. Li does not precipitate.

Table 4 as well as FIG. 4 compiles the results obtained after inductively coupled plasma optical emission spectrometry (ICP-OES) measurements of the composition of the solution after carrying out the experiments with different amounts of NaOH added and at different pH values.

TABLE 4

Precipitation yield % of different elements present in the leachate solution of Example 2.

| | | Precipitation yield % | | | | | | | | | |
|---|---|---|---|---|---|---|---|---|---|---|---|
| pH | NaOH (g/L) | Co | Ni | Mn | Li | Zn | Cu | Fe | P | Mg | Al |
| 1.13 | 70 | 0.0 | 2.5 | 1.3 | 0.0 | 0.0 | 1.8 | 0.4 | 0.2 | 0.0 | 0.0 |
| 1.26 | 73.5 | 0.0 | 1.9 | 2.0 | 0.0 | 0.0 | 2.4 | 0.5 | 0.0 | 0.0 | 0.0 |
| 1.4 | 77 | 0.0 | 2.6 | 2.6 | 0.0 | 0.0 | 2.6 | 1.5 | 0.0 | 0.0 | 0.0 |
| 1.56 | 80.5 | 0.0 | 1.4 | 0.8 | 0.0 | 0.0 | 1.3 | 1.1 | 0.0 | 0.0 | 0.0 |
| 1.78 | 84 | 0.0 | 1.8 | 1.8 | 0.0 | 0.0 | 2.5 | 1.5 | 0.0 | 0.0 | 0.0 |
| 2.1 | 91 | 0.0 | 1.4 | 1.2 | 0.0 | 0.0 | 1.8 | 79.9 | 35.1 | 0.0 | 28.7 |
| 2.11 | 94.5 | 0.0 | 2.5 | 1.3 | 0.0 | 0.0 | 3.2 | 81.6 | 40.2 | 0.0 | 34.5 |
| 2.26 | 98 | 0.0 | 1.6 | 1.5 | 0.0 | 0.0 | 2.6 | 92.4 | 58.1 | 0.0 | 52.7 |
| 2.76 | 101.5 | 0.0 | 1.0 | 0.5 | 0.0 | 0.0 | 3.4 | 99.4 | 88.3 | 0.0 | 87.8 |
| 3.26 | 105 | 0.0 | 1.0 | 1.8 | 0.0 | 0.0 | 4.8 | 100.0 | 94.3 | 0.5 | 95.7 |
| 6.43 | 158.2 | 54.2 | 58.1 | 53.3 | 0.0 | 99.4 | 99.9 | 100.0 | 99.3 | 32.2 | 99.9 |

The precipitation yields for P are in accordance with precipitation yields for Fe and Al as result of the formation of iron-aluminum phosphate precipitates. The 10% excess of phosphorus is sufficient to precipitate Fe and Al and selective against the rest of the elements at a pH of below 3.5.

Without further elaboration, it is believed that a person skilled in the art can, using the present description, including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Itemized Listing of Embodiments

This is an itemized listing of embodiments of the present disclosure:
1. A process for removal of aluminium and iron in the recycling of rechargeable lithium ion batteries, said process comprising:
   a) extracting copper from a leachate from black mass producing a first leachate,
   b) adding phosphoric acid ($H_3PO_4$) to the leachate from step a),
   c) adjusting the pH to form iron phosphate ($FePO_4$) and aluminium phosphate ($AlPO_4$),
   d) precipitating and removing the formed $FePO_4$ and $AlPO_4$, and
   e) forming a filtrate for recovery of cathode metals.
2. The process according to item 1, wherein the precipitation is performed in two steps at different pH.
3. The process according to item 2, wherein the pH in a first precipitation step is adjusted to an interval of pH 1.5 to 4, such as pH 1.5 to 3.5, preferably pH 1.5 to 3, and wherein the pH, in a second step, is adjusted to an interval of pH 3 to 6.5, such as pH 3 to 6, preferably pH 3 to 5.5.
4. The process according to item 2 or 3, wherein crystallization seeds are added to precipitate $FePO_4$ and $AlPO_4$ in the first precipitation step.
5. The process according to item 4, wherein the crystallization seeds comprise aluminium and iron phosphate crystals and wherein said seeds are added in an amount of 0.05-0.3 g/L, such as 0.05-0.2 g/L, preferably 0.05-0.15 g/L.
6. The process according to any one of the items 3-5, wherein the precipitation steps are conducted at a temperature in the interval of 55-95° C., such as 55-85° C., preferably 65-75° C.
7. The process according to any one of the items 3-6, wherein each precipitation step has a residence time in the interval of 2-24 h, such as 2-12 h, preferably 2-6 h.
8. The process according to any one of the items 3-7, wherein a higher amount of $FePO_4$ and $AlPO_4$ is precipitated in the first precipitation step than in the second precipitation step.
9. The process according to any one of the preceding items, wherein the precipitate comprising $FePO_4$ and $AlPO_4$ is washed with an aqueous solution having a pH in the interval of pH 1.5-5.5, preferably pH 1.5-2.5.
10. The process according to any one of the preceding items, wherein the filtrate comprises lithium, nickel, manganese and cobalt, and less than 10 ppm, such as less than 5 ppm of aluminium and/or iron and/or copper.

The invention claimed is:

1. A process for removal of aluminum and iron from black mass in the recycling of rechargeable batteries, the aluminum being removed in the form of aluminum phosphate ($AlPO_4$) and the iron being removed in the form of iron phosphate ($FePO_4$), said process comprising:
providing a leachate from black mass,
adding phosphoric acid ($H_3PO_4$) to the provided leachate,
adjusting the pH of the $H_3PO_4$ containing leachate to form the ($FePO_4$) and the ($AlPO_4$,
precipitating and removing the formed $FePO_4$ and $AlPO_4$ from the pH adjusted $H_3PO_4$ containing leachate, and forming a filtrate for recovery of cathode metals.

2. The process according to claim 1, wherein the rechargeable batteries are rechargeable lithium ion batteries.

3. The process according to claim 1, wherein the precipitation is performed in two steps at different pH levels.

4. The process according to claim 3, wherein the pH in a first precipitation step is adjusted to an interval of pH 1.5 to 4.

5. The process according to claim 4, wherein the interval of pH is either: 1.5 to 3.5 or 1.5 to 3.

6. The process according to claim 3, wherein the pH, in a second step, is adjusted to an interval of pH 2.5 to 6.5.

7. The process according to claim 6, wherein the interval of pH is either: 2.5 to 6 or 2.5 to 4.

8. The process according to claim 3, wherein crystallization seeds are added to precipitate $FePO_4$ and $AlPO_4$ in the first precipitation step.

9. The process according to claim 8, wherein the crystallization seeds comprise aluminum and iron phosphate crystals and wherein said seeds are added in an amount of 0.05-0.3 g/L.

10. The process according to claim 9, wherein the amount of added seeds is either 0.05-0.2 g/L or 0.05-0.15 g/L.

11. The process according to claim 3, wherein the two precipitation steps are conducted at a temperature in an interval of 20-95° C.

12. The process according to claim 11, wherein the temperature interval is either: 55-85° C. or 65-75° C.

13. The process according to claim 3, wherein each of the two precipitation steps has a residence time in an interval of 2-24 hours.

14. The process according to claim 3, wherein the residence time interval is one of: 12-18 h, 2-12 h, or 2-6 hours.

15. The process according to claim 3, wherein a higher amount of $FePO_4$ and $AlPO_4$ is precipitated in a first precipitation step than in a second precipitation step.

16. The process according to claim 1, wherein the precipitate comprising $FePO_4$ and $AlPO_4$ is washed with an aqueous solution having a pH in an interval of pH 1.5-5.5.

17. The process according to claim 1, wherein the aqueous solution pH interval is 1.5-2.5.

18. The process according to claim 1, wherein the filtrate comprises:
lithium, nickel, manganese and cobalt, and
less than 10 ppm of one or more of aluminum, iron, or copper.

19. The process according to claim 1, wherein the leachate provided from the black mass is substantially copper free.

20. The process according to claim 1, wherein copper is recovered subsequently to the removal of the aluminum in the form of the $AlPO_4$ and the iron in the form of the $FePO_4$.

* * * * *

UNITED STATES PATENT AND TRADEMARK OFFICE
CERTIFICATE OF CORRECTION

| | |
|---|---|
| PATENT NO. | : 11,509,000 B2 |
| APPLICATION NO. | : 17/601865 |
| DATED | : November 22, 2022 |
| INVENTOR(S) | : Alemrajabi et al. |

It is certified that error appears in the above-identified patent and that said Letters Patent is hereby corrected as shown below:

On the Title Page

Item (87):
"(87)   PCT Pub. No.: WO2020/212363
        PCT Pub. Date: Oct. 20, 2020"
Should read:
--(87)  PCT Pub. No.: WO2020/212363
        PCT Pub. Date: Oct. 22, 2020--

Signed and Sealed this
Twenty-third Day of May, 2023

Katherine Kelly Vidal
*Director of the United States Patent and Trademark Office*